United States Patent
Krusche et al.

[15] 3,672,161
[45] June 27, 1972

[54] CONTROL SYSTEM FOR A STEPLESS HYDROSTATIC DRIVE

[72] Inventors: Alfred Krusche, Grossostheim; Helmuth Rosslein, Lohr/M., both of Germany

[73] Assignee: Linde Aktiengesellschaft, Wiesbaden, Germany

[22] Filed: Jan. 13, 1971

[21] Appl. No.: 106,095

[30] Foreign Application Priority Data

Jan. 15, 1970 Germany..................P 20 01 701.0

[52] U.S. Cl. ..................................60/19, 60/53 R, 180/6.48
[51] Int. Cl. ..........................................F02b 41/00
[58] Field of Search...................................60/19, 53; 180/6.48

[56] References Cited

UNITED STATES PATENTS

| | | | |
|---|---|---|---|
| 2,941,609 | 6/1960 | Bowers et al. | 60/53 R X |
| 3,161,245 | 12/1964 | Thoma | 60/53 R X |
| 3,230,699 | 1/1966 | Hann et al. | 60/19 |
| 3,247,919 | 4/1966 | Moon | 180/6.48 |

*Primary Examiner*—Edgar W. Geoghegan
*Attorney*—Karl F. Ross

[57] ABSTRACT

A hydrostatic drive has a pump driven by a prime mover, e.g., an internal-combustion engine, and connected in a substantially closed hydraulic power circuit with a hydraulic motor connected to a load. The hydrostatic drive may be used, for example, to power a vehicle or an accessory or appliance of the vehicle. The hydrostatic pump-motor system has a control member shiftable to vary the speed of the system in a stepless manner and operated by a servocylinder from a pilot valve which, in turn, is controlled by the pressure in a pair of pilot lines. A speed governor or sensor responsive to an overload of the engine, automatically acts upon the pilot valve to reduce the speed in the vent of a torque overload.

12 Claims, 1 Drawing Figure

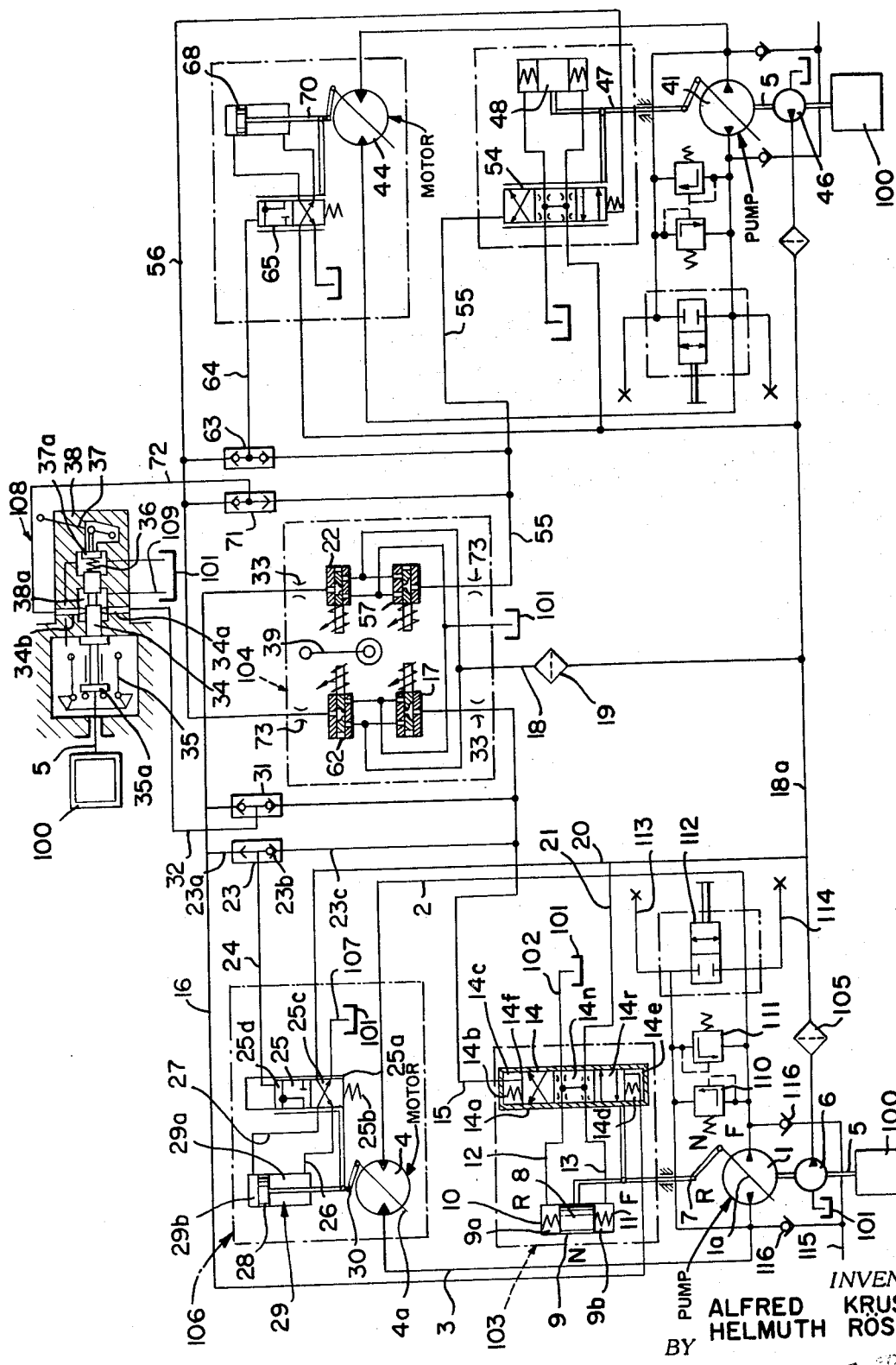

CONTROL SYSTEM FOR A STEPLESS HYDROSTATIC DRIVE

1. Field of the Invention

Our present invention relates to a hydraulic drive and control systems therefor and, more particularly, to a control system for a stepless hydrostatic drive.

2. Background of the Invention

In a hydraulic or stepless hydraulic drive, a hydrostatic motor may be coupled with a load and may be connected in a substantially closed power circuit with a hydraulic pump which can be driven by a prime mover, e.g., an internal combustion engine.

Hydraulic pumps and motors, for this purpose, generally comprise a rotatable cylinder barrel or drum having a plurality of angularly spaced pistons reciprocable in respective cylinder bores and bearing against a control surface which may be inclined to the axis of rotation of the drum and which may, moreover, be connected with the shaft. In the case of an axial-piston pump of this type, the shaft is driven and the stroke of the pistons may be varied by adjusting the angle between the plate or control surface (control box) and the axis of rotation of the drum. When this control surface lies perpendicular to the axis, the pump is in a "neutral" or "idle" mode and no fluid displacement occurs. When the surface is tilted in one direction about its axis of swing perpendicular to the axis of rotation of the cylinder drum, one of the ports of the pump is constituted as the outlet, discharge or pressure port while the other port is constituted as the intake or lowpressure port; reversing the direction of tilt of the control surface, however, reverses the functions of the ports and transforms the erstwhile discharge port into an intake port and the former intake port into the discharge or high-pressure port. The hydraulic motor, similarly, comprises a cylinder drum in which the pistons bear against a control surface which may be inclined to the axis of the drum and is provided with the shaft connected to a load. The control surface of the motor may also be tiltable to vary the output speed and torque for a given volume-rate-of flow of the hydraulic fluid.

The hydraulic pump and the hydraulic motor are generally connected by two hydraulic lines in a substantially closed fluid circuit and any leakage from either hydraulic machine can be collected in a sump and replaced. Apart from such leakage, however, substantially all of the fluid is to be found in the hydraulic machines or the hydraulic lines and is continuously cycled therethrough. Hydraulic machines of this type are described in FLUID POWER, U.S. Government Printing Office, Washington, D.C., 1966, pages 109 ff., 199 ff., and 206 ff.

When the principles of stepless hydrostatic drives are applied in automotive vehicles, for example, the hydraulic motor may be connected to the vehicle wheels or to each wheel and a pump may be provided in common for a number of such hydraulic motors. Hydrostatic drives also have applications elsewhere. For example, they have been found to be advantageous in automotive cranes for driving the crane, for rotating the turntable or turret of the crane, for operating the lifting mechanism or windlass and for raising or lowering the boom or jib; they are also useful in operating a variety of hoists.

The hydrostatic drives have been controlled heretofore by servo systems in which, for example, a pilot valve has a normal servo position corresponding to the neutral or null position of the pump and is shiftable to either of two extreme positions manually or by remotely actuatable means to connect a servo-cylinder to a source of control pressure. They cylinder may have a double-acting piston which is connected by a suitable linkage to the control member of the hydraulic pump and/or the control member of the hydraulic motor.

It has also been observed that it is common practice to provide hydrostatic drives in conjunction with prime movers such as internal-combustion engines. In such cases a problem arises because of the high versatility of the hydrostatic drive. Assume, for example, that the drive is shifted into a high-speed condition with a large load at the output shaft of the hydraulic motor. Frequently the internal-combustion engine will be overloaded with the obvious disadvantages and dangers to the entire system. It is known to provide a speed-sensitive device to automatically reduce the volume flow rate of the pump when the internal-combustion engine is overloaded. Conventional systems for this purpose are, however, unduly complex and expensive and are not sufficiently sensitive for precision control of the load.

OBJECTS OF THE INVENTION

It is the principal object of the present invention to provide an improved stepless hydrostatic drive wherein the aforementioned disadvantages are avoided and which allows, in a simple, inexpensive and convenient manner, precision control of the operation of a load and provides overload limiting in response to the speed of the power source.

It is another object of this invention to provide an improved hydrostatic drive for a vehicle.

It is still another object of this invention to provide an improved hydrostatic drive for the tracks on opposite sides of a tracked vehicle.

It is also a further object of this invention to provide an improved hydrostatic drive, for the purposes described, having overload protection means in response to the speed of an engine shaft.

SUMMARY OF THE INVENTION

These objects and others which will become apparent hereinafter are attained, in accordance with the present invention, in a hydrostatic drive having, in accordance with conventional practice, a hydraulic power pump connected to the engine, a hydraulic motor connected to the load, conduit means defining a power-fluid circuit between the hydraulic pump and motor, and a control system including a pilot valve actuatable to operate a positioning cylinder, the piston of which is connected with the control member of the hydraulic pump/motor assembly.

The improvement of the present invention resides in the provision, between the pilot valve and a remote control valve for operating same (e.g., a transmitter valve), of a pressure-relief valve responsive to the speed of the shaft of the internal-combustion engine, a throttle being provided between the transmitter valve and the point at which the relief valve is connected to ensure that the principal flow from the pilot-fluid line through the relief valve derives from the pilot valve rather than from the control or transmitter valve.

While the throttle does affect the speed at which fluid from the control or transmitter valve may be made available to adjust the drive, it has been found that this is no disadvantage since the response speed is in any event higher than is required in all cases and the throttling action provides greater sensitivity control. In fact, we prefer to provide a pilot-valve system that includes a distributing valve designed such that the volume rate of flow from the control or transmitter valve to the plot valve is not the significant factor but rather has as its significant parameter the pressure in the pilot-fluid line.

Since the pilot valve system of the present invention is responsive only to the pilot-fluid pressure and not to the volume of the pilot fluid, the system, including the speed-responsive relief valve, is substantially independent of the source of the hydraulic drive controlled thereby and of the number of hydrostatic systems provided in the drive. Consequently, two or more hydraulic power circuits and control arrangements may be provided with a common relief valve, although we may provide a relief valve individual to each of the hydrostatic drums.

Advantageously, the control system includes means for bringing the output or load shaft of the system to a standstill and hence we prefer to provide a pilot valve having three positions, including an intermediate position into which the valve member is normally biased and corresponding to a "neutral" position of the control member of the pump/motor combination, and a pair of extreme positions corresponding to the operating positions of the control member. To this end, the transmitter may include a pair of control valves each applying pilot-fluid pressure to one side of the valve member through a respective pilot-fluid line provided with a throttle. Between the throttle and the pilot valve, we bridge the pilot-fluid lines with a changeover valve whose output is applied to the relief valve. The changeover valve is so constructed and arranged as to control the fluid flow by virtue of the back pressure thereof, i.e., the pressure at the output port of the changeover valve. Hence, whenever the pressure in one of the pilot-fluid valves exceeds substantially the pressure at the output thereof, fluid is drained from this line into the output line of the changeover valve. Consequently, whenever the pressure is brought to the low-pressure level of the reservoir by the relief valve, the pressurized pilot-fluid line is drained and the pilot valve member returned toward its neutral or intermediate position. The use of a changeover valve has the advantage that it provides low-cost control of two lines with a single relief valve and minimizes the control circuitry which would otherwise be necessary.

When two hydrostatic drives are connected together, they may be used to operate an automotive vehicle which may have difference speeds on the opposite sides thereof. This is the case for tracked vehicles in which steering is carried out by modifying the relative speeds of the two tracks. According to an important feature of the present invention, therefore, one of the hydraulic pump circuits is connected between the power shaft of the internal-combustion engine and the load shaft of one of the tracks of the vehicle while the other hydraulic power circuit is connected between the engine and the other track, the control arrangements for the two power circuits being separate but substantially identical. A common relief valve is, however, provided. In some cases it may be desirable to provide separate relief valves and this can be accomplished by providing, in a common housing, a pair of nozzles each connected to the output of a changeover valve of one of the power circuits, both nozzles being blocked by a plunger controlled by a centrifugal governor. This has the important advantage in vehicle drives that, should the overload occur when the vehicle is traveling along a curve or is turning, both systems will be relieved proportionally and the speed ratio of the tracks will remain the same.

It will be apparent that the system can operate with a single pump or with pumps individual to the power circuit, that the control of pilot fluid may be provided with a single pump common to both power circuits or via individual pumps and that other devices having common functions may be replaced by a single device.

It has also been found to be advantageous to provide a control member for the hydrostatic motor as has been suggested heretofore for primary and secondary regulation, in which case the hydrostatic motor may be operated with still another servosystem. In this case, we prefer to provide a changeover valve between the pilot-fluid lines which acts upon the further pilot valve of the motor control member. The pilot valve may be biased simply by a spring against the single control pressure of the changeover valve. This arrangement allows the pump to be shifted from its neutral position fully before the motor is brought into a lower stroke/volume per revolution.

Mention may be made of the fact that the system is preferably used as a load-limiting arrangement in which case the relief valve is connected to the input or drive shaft. When, however, it is desired to provide the system as a speed governor, we may use the relief valve on the load shaft. In this case, individual relief valves may be used for each of the power systems to prevent overrunning of one of the output shafts relative to the other.

Systems in which the individual drives have their own adjustable relief valves advantageously include hoists, tow lines and the docking lines of ships, in which the two cables must be moved simultaneously, but may be subjected to different loads and may extend to different extents from the windlass.

According to still another feature of this invention, the relief valve comprises a centrifugal governor or controller which may have a limited length and may be provided with an abutment which prevents displacement of the centrifugal members beyond that necessary to render the relief valve effective. As a result, the centrifugal governor is a two-point controller which is ineffective at any speed above the threshold speed of interest, by virtue of an engagement of the centrifugal members with an abutment or a surface. The stroke of the plunger controlling the valve can therefore be small, the response high and the hysteresis effects insignificant.

DESCRIPTION OF THE DRAWING

The invention is described in greater detail below with reference to the accompanying drawing, the sole FIGURE of which is a hydraulic circuit diagram illustrating the invention.

SPECIFIC DESCRIPTION

In the drawing, we show a hydrostatic drive having two hydrostatic power circuits which may be connected to the driving members on opposite sides of a vehicle, e.g., the right and left-hand tracks of a tracked vehicle.

The left-hand hydrostatic drive comprises a power pump 1 of the axial-piston type (see FLUID POWER, U.S. Government Printing Office, Washington, D.C. 1966, pages 109 ff.) the control member of which is represented at 1a and is swingable between a central position N illustrated in the Figure, and a pair of opposite positions represented as R and F, respectively, indicating reverse and forward directions.

These directions are identified solely for convenience inasmuch as the actual load-operating sense will depend upon the nature of the load. For example, if the hydrostatic drive is used to operate vehicle wheels or tracks, as suggested earlier, the positions R and F can, of course, represent reverse and forward directions, respectively, the neutral position (N) representing standstill. When the hydrostatic drive is used to rotate a turntable or turret, however, such as that of a crane, the position N will again represent neutral or standstill, while positions R and F may represent clockwise and counterclockwise rotation respectively. When the hydrostatic drive is used to operate the boom or jib of a crane, position N will represent standstill while positions R and F may represent raising and lowering movement of the boom, respectively. When the hydrostatic drive is used to operate the lifting mechanism of the crane, position N will represent an immobile condition of the load while positions R and F may represent the lowering and raising of the load, respectively.

In accordance with the principles of hydrostatic drives, the opposite sides of the power pump 1 are connected by power-fluid lines 2 and 3 with the opposite sides of a hydrostatic motor 4 which may also be of the axial-piston type (see, for example, FLUID POWER, pages 199 ff. and 206 ff.). This hydrostatic motor may have a shifting member which can be coupled with the control member but preferably is independently operated as will be seen hereinafter. It will be understood that the members 1–4 thus constitute a substantially closed circuit with any fluid leakage being collected in a reservoir (not shown) and returned to the circuit by, for example, an auxiliary pump which is not directly connected in the power system.

The drive shaft 5 of the pump 1 is provided with an auxiliary pump 6 for the pilot and control fluid as will be apparent hereinafter. The shaft is also connected with a prime mover, e.g., an internal-combustion engine 100, which is shown at several locations in the drawing to indicate that several systems are driven thereby. It will be understood, however, that generally only a single internal-combustion engine is provided and all of the pumps and similar systems are mechanically connected thereto via gears or the like.

The setting unit for the pump 1 consists of a mechanical linkage 7 which is hingedly connected to member 1a and carries the pilot valve 14, while being affixed to a piston 8 forming part of the pilot control system or servomechanism for adjusting the control member 1a of the pump 1. The piston 8 is of the double-acting type and is mounted in a cylinder 9 and biased into its neutral position N by a pair of oppositely effective compression springs 10 and 11, respectively mounted in the compartments 9a and 9b of the cylinder 9. The compartments 9a and 9b are connected via control-fluid lines 12 and 13 to a four-port, three-position (three-way) distributing valve 14 serving as the pilot valve for the system.

The valve 14 has an intermediate position 14a in which lines 12 and 13 are connected together through respective throttles and to the reservoir 101 as well as to the control-fluid supply line 21 via another pair of throttles, thereby preventing any substantial pressure drop from developing in this intermediate position of the valve in the control circuit. However, the intermediate valve position allows the pressure in compartments 9a and 9b to equalize and thereby permits the springs 10 and 11 to shift the assembly into its neutral position. In position 14f of the valve, line 12 is connected with the supply line 21 while line 13 is connected with the reservoir 101, thereby pressurizing compartment 9a, while depressurizing compartment 9b and displacing the piston 8 into its forward position F to swing member 1a into its position F. Conversely, in position 14r of the valve 14, line 12 is connected with the reservoir 101 via the line 102 while line 13 is connected to the supply line 21. Pressure is thus able to build up in compartment 9b and is relieved in compartment 9a to displace the piston 8 into position R. The valve member 14a of valve 14 is biased into its intermediate position by a pair of centering springs 14b and can be shifted by pilot-fluid pressure applied to a compartment 14c or 14d to either side of the valve member. In place of the compartments 14b and 14c, control pistons may be provided and can be mechanically coupled to the valve member 14a.

Pilot-fluid pressure is applied to one side of the valve member via a line 15 and to the other side of the valve member 14a via line 16. An increase in pressure in line 15 corresponds to a shift of the valve member 14a into its position 14f while an increase in the pressure at line 16 corresponds to a tendency of the valve member to move into position 14r. The assembly 103, therefore, represents the control valve and servoarrangement for adjusting member 1a of the pump 1.

According to the present invention, a transmitting system 104 is provided for controlling the several hydrostatic drives. This system may include a transmitting valve 17 remote from the system 103 and connected thereto by the line 15 through a throttle 33. The valve 17 is supplied with control fluid from the pump 6 via a filter 105, a line 18a, a line 18 and a further filter 19 or may alternatively connect line 15 with the reservoir 101. As illustrated, valve 17, (and each of the transmitter valves described hereinafter), is of the three-port, three-position (three-way) type and has an intermediate position as illustrated wherein line 15 (pilot-fluid line) is cut off, a position in which line 15 is connected to the source of control pressure 18, and a position in which line 15 is connected to the reservoir 101, i.e., is substantially pressureless.

A branch 20 from the source of control fluid supplies the line 21 mentioned earlier. Pilot-fluid line 16 is, by analogy, connected via a throttle 33 to the manually operated transmitter valve 22 and can be connected with either line 18 or the reservoir 101 as previously described.

From each of the pilot-fluid lines 15 and 16, fluid is applied via line 23a and 23c to a changeover valve 23 whose outlet line 24 extends to a valve 25, the latter constituting the pilot valve of the motor-setting mechanism represented diagrammatically at 106. The valve 23 may have a ball-check 23b which permits fluid flow into the valve from line 23c when the pressure in the valve is below that necessary to set the ball. A throttled flow may be provided in the opposite direction from line 16, although another ball check may be provided in this direction as well. In the latter case, only the back pressure in line 24 will control which, if either, of the lines 15 and 16 deliver fluid to the valve 23 and hence to the control line 24 which applies pressure to the valve member 25a of the pilot valve 25. The pilot valve 25 is a four-port, two-position (two-way) distributing valve which is provided with a spring 25b normally biasing the valve member 25a against the pressure from line 24 into the position 25c in which a control line 27 is connected with the reservoir 101 while the line 26 is connected with the control-fluid line 20. In position 25d, however, line 107 to the reservoir 101 is blocked and control fluid pressure is applied to both lines 26 and 27.

Lines 26 and 27 are connected to compartments 29a and 29b of a servocylinder 29 on opposite sides of the piston 28. The piston 28 is, moreover, linked by member 30 to the control member 4a of the hydrostatic motor 4. In this case, no mechanical coupling need be provided between the control member 4a of the motor and the control member 1a of the pump. The housing of valve 25 is also connected with the piston 28 in the same manner in which the housing of valve 14 is connected with the linkage 7.

Bridging lines 15 and 16, is another changeover valve 31, poled inversely to the changeover valve 23 but of similar construction. The control line 32, which opens into the changeover valve 31 intermediate its inlet ports, is connected to a relief valve generally designated at 108. The relief valve 108 is speed-responsive, i.e., is regulated, by, the angular velocity of the shaft 5 of the internal-combustion engine. This valve 108 comprises a valve housing 38 in which outwardly swingable centrifugally displaceable weights 35 are diagrammatically shown to be coupled with the shaft 5 and to displace a plunger 35a which, in turn, bears against a control slide 34 which is axially shiftable in the housing 38 and constitutes a valve member which, in the illustrated position, blocks a pair of radial nozzles 34a and 34b opening into the chamber 38a of this valve. The housing limits the outward swing of the centrifugal elements as noted earlier. The chamber 38a is connected with the reservoir 101 via a line 109. The control slide or valve member 34 is, moreover, urged to the left by a prestressed compression spring 36 which seats, on the one hand, against the control member 34 and, on the other hand, against a body 37a which may be axially shifted via a lever 37 or some other control means to vary the precompression of the spring 36. The lever 37 is, in turn, displaced by a linkage, not illustrated, connected to the internal combustion engine.

The hydrostatic drive shown at the right-hand side of the drawing is essentially equivalent to the hydrostatic drive of the left-hand side, the corresponding elements having reference numerals increased by the factor of 40.

Each of the power circuits may be provided with pressure-relief valves 110 and 111, operable upon rotation of the pump in opposite directions to prevent overload of the latter. A shunt valve 112 may be provided for emergencies to depressurize the several systems by connecting the opposite sides of the pump 1 together. Furthermore, lines 113 and 114 can be used to supply power fluid to other hydrostatic loads and to connect the pump of the various hydrostatic drives together so that failure of one pump will permit the other pumps to take over the function of the defective one. To this end, a supply line 115 may be provided with check valves 116 connected to the two sides of the pump to permit fluid to pass into lines 2 and 3 from another source.

Reviewing the structure of the hydrostatic drive at the right-hand side of the system briefly, it will be apparent that the power circuit for driving the right-hand track of the vehicle can comprise a hydrostatic pump 41 which may be driven by the shaft of the internal-combustion engine 100 and a control-fluid auxiliary pump 46 which may feed line 18 mentioned earlier. A pilot valve 54 is operable in response to pilot pressure applied via lines 55 and 56 to control a servopiston 48 which is coupled with the control member of the pump 41 via a linkage 47. The pump is connected in the power circuit with the hydrostatic motor 44 whose control member is coupled with a servopiston 68 by the linkage 70, a pilot valve 65 being provided to control the piston 68. The lines 55 and 65 are bridged by a changeover valve 63 whose control line 64 is applied as a control signal to the valve 65 and by a changeover valve 71 whose control signal is applied to the nozzle 34b of the speed responsive valve 108, 38. The pilot-fluid lines 55 and 56, moreover, are connected to manually operated transmitter valves 57 and 62, respectively, which are provided with throttles at 73.

The four transmitter valves 17, 22, 57 and 62 may be mounted in a single unit and operated by a universally pivoted control lever 39. A control lever of this type is described and claimed in the commonly assigned application Ser. No. 59,081, filed July 29, 1970. Also, valves 17, 22 and valves 57, 62 may be cross connected so that one vents its pilot-fluid line when the other pilot-fluid line is pressurized and vice versa.

It has been observed that two control-fluid pumps 6, 46 have been provided in this system and that they supply a common control network. It is also possible to make use of a relatively large pump 6 so that only a single control pump will be required.

OPERATION

When the internal-combustion engine is in operation and the entire system has valves in the positions illustrated, hydraulic fluid does not circulate in the power circuits, since the pumps 1 and 41 are set at "neutral." Fluid is, however, displaced through the control lines 18, 20, 21, but valves 25 and 65 are biased into the illustrated positions by the respective springs, thereby urging the pistons 28 and 68 into their upper positions.

For forward motion of the vehicle, the lever 39 actuates valves 17 and 57 to provide control fluid in the lines 15 and 55; the valves 17 and 22 and the valves 57 and 62 may be reciprocably connected so that one line 15 or 45 is pressurized while the other line 16 or 56 is depressurized and vice versa. The pilot-fluid pressure in lines 15 and 55 shifts the valve members of valves 14 and 54 downwardly as represented in the drawing and applies control pressure to the upper chamber of the servo-pistons 8 and 48 simultaneously. The pistons 8 and 48 are thereby shifted out of their neutral positions to operate the control members of the pumps 1 and 41 and drive the motors 4 and 44 at equal speeds in the forward direction. Conversely, joint operation of valves 22 and 62 will cause the pilot lines 16 and 56 to be pressurized and move the valve members of valves 14 and 54 upwardly, and shift the pistons 8 and 48 upwardly to reverse the flow of fluid in the pumps 1 and 41, thereby reversing the vehicle tracks equally on both sides of the vehicle.

For steering movement, the right and left-hand valves are operated selectively. Hence, if valve 17 is displaced to a significant extent and valve 62 to a lesser extent, the left-hand track will be driven at a relatively high speed and the right-hand track at a relatively low speed in the reverse direction. Hence, accurate control of the steering is obtained when valves 17 and 57 are operated simultaneously but to different degrees, the vehicle will move forward but will curve to the right. Similarly, operation of the valves 22 and 62 simultaneously will permit rearward movement which will be rectilinear or curved, depending upon the extent to which the valves are shifted.

When the pilot-fluid pressure applied by either of the line 15 or line 16 or either of the lines 55 or 56, exceeds the pressure necessary to drive the respective member of the valves 14 or 54 into its limiting position in the opposite direction, a corresponding pressure is applied via the changeover valve 23 or 63 to the valve 25 or 65 to adjust the control member of the servomotor 4 or 44 by the linkage 30 or 70. The angular velocity of the hydrostatic motor is thereby increased corresponding to the demand represented by the higher pressure in the pilot line. However, should the increased power requirement overload the internal-combustion engine, the angular velocity of shaft 5 drops, thereby permitting the spring 36 to shift the valve member 34 to the left and unblock the nozzles 34a and 34b at the end of the lines 32 and 72. Changeover valves 31 and 63 are thereby relieved, i.e., the back pressure is lowered, and fluid from line 15 or 55 is drained to the reservoir 101. A pressure drop in line 15 or 55, of course, tends to permit the valve members 14 or 54 to move toward their neutral position and thereby reduces the speed of the pumps 1 and 41 to prevent overload.

The improvement described and illustrated is believed to admit of many modifications within the ability of persons skilled in the art, all such modifications being considered within the spirit and scope of the invention except as limited by the appended claims.

We claim:

1. A stepless hydraulic drive connected between a power shaft and a load shaft, comprising:

a hydraulic power circuit including a hydraulic pump connected with said power shaft, a hydraulic motor in fluid communication with said pump and operatively connected with said load shaft, and a control member for varying the output speed of said hydraulic motor with respect to the speed of said power shaft;

a control arrangement for said hydraulic power circuit including a pilot valve connectable to a source of fluid pressure and having a valve member shiftable between at least two positions, a positioning cylinder connected to said pilot valve and hydraulically energizable by said source through said pilot valve and connected to said control member for shifting same, a transmitter including a control valve for applying fluid pressure to said valve, and a pilot-fluid line connected between said control valve and said pilot valve for applying pilot pressure to said valve member;

a speed-responsive relief valve connected between said line and a low-pressure space and responsive to the speed of one of said shafts for relieving the pressure in said line upon a diminution of the speed of said one of said shafts; and a throttle in said line between said transmitter and the point at which said relief valve is connected to said line.

2. Stepless hydraulic drive defined in claim 1 wherein:

said pump is a hydrostatic pump provided with said control member;

said motor is a hydrostatic motor and said power circuit includes a pair of power-fluid lines connecting said pump and said motor in a closed system;

said control member is shiftable from a neutral position in opposite directions into a pair of operating directions;

said positioning cylinder is a double-acting piston connected to said member and defining in said cylinder a pair of working chambers, said pilot valve being a four-port three-position valve with a pair of ports connected respectively to said working chambers, a further port connected to said source and another port connected to a fluid reservoir, said valve member being biased into an intermediate position corresponding to said neutral position of said control member and being shiftable into a pair of extreme positions respectively corresponding to the operating positions of said control member by pilot-fluid pressure applied in opposite directions to said valve member; and said control arrangement comprises a further pilot-fluid line connected between said transmitter and said pilot valve for applying pilot pressure to said valve member in a direction opposite the pilot-fluid pressure applied through the first-mentioned pilot-fluid line.

3. The stepless hydraulic drive defined in claim 2 wherein said control arrangement includes a changeover valve having a pair of inputs respectively connected to said pilot-fluid lines and an output between said inputs connected to said relief valve, said changeover valve being so constructed and arranged that fluid is drained from one of said pilot-fluid lines upon the pressure at said output falling substantially below the pressure in said one of said lines.

4. The stepless hydraulic drive defined in claim 3, further comprising a second substantially identical hydraulic power circuit, a control arrangement and throttle connected by a respective changeover valve to said speed responsive relief valve for controlling another load.

5. The stepless hydraulic drive defined in claim 4 wherein said relief valve is provided with a valve housing, a plunger shiftable in said housing, a pair of nozzles opening into said housing and respectively connected with the outputs of said changeover valves and normally blocked by said plunger, spring means in said housing biasing said plunger into a position unblocking said nozzles, and centrifugal governor means connected with said shaft for permitting displacement of said plunger upon decrease in the speed thereof, said housing opening into said reservoir.

6. The stepless hydraulic drive defined in claim 5, further comprising adjusting means for selectively varying the force of said spring means.

7. The stepless hydraulic drive defined in claim 3 wherein the last two power hydraulic circuits and control arrangements are provided and said relief valve is connected exclusively to one of them.

8. The stepless hydraulic drive defined in claim 1 wherein said relief valve is connected to said load shaft.

9. The stepless hydraulic drive defined in claim 8 wherein the relief valve is connected to said power shaft.

10. The stepless hydraulic drive defined in claim 3 wherein said motor is provided with a further control member for varying the speed of said load shaft, said relief valve being connected to said power shaft, said control arrangement further comprising a further cylinder having a piston connected to said further control member, a further pilot valve connected between said source and said further cylinder and biased by a control fluid pressure, and a further changeover valve connected across between said pilot-fluid lines and having an output applied to said further pilot valve.

11. The stepless hydraulic drive defined in claim 10 wherein said transmitter includes:
    a pair of control valves each connected between said source and one of said pilot-fluid lines, said stepless hydraulic drive further comprising a further hydraulic power circuit and control arrangement substantially identical to the first-mentioned hydraulic power circuit and control arrangement for operating a further load; and
    a common control member for operating all of said control valves.

12. The stepless hydraulic valve defined in claim 11 wherein each of said control valves is provided with a respective one of said throttles, said source includes an auxiliary pump connected with said power shaft, said power shaft is the output shaft of an internal combustion engine, and the load shafts are connected to the driving members of a vehicle powered by said engine.

* * * * *